July 24, 1934.  J. A. STREUN  1,967,845
CHANGE BALE HOPPER
Filed April 5, 1932
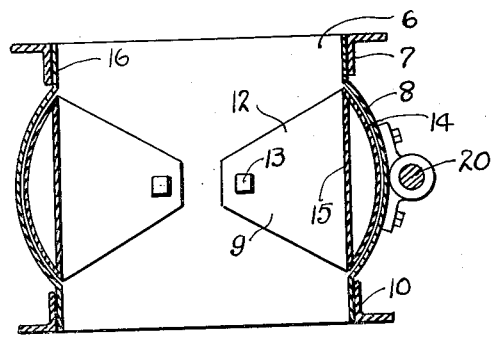
Fig. 2
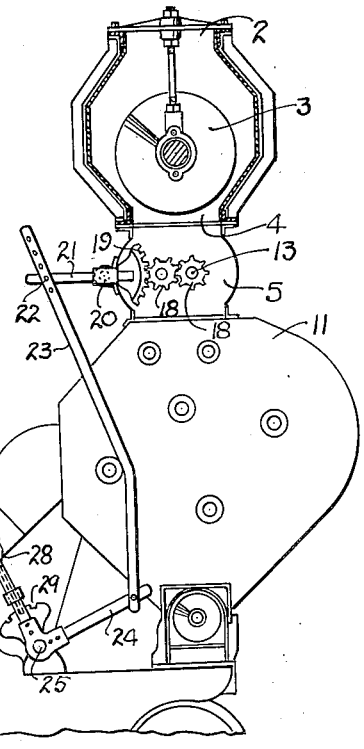
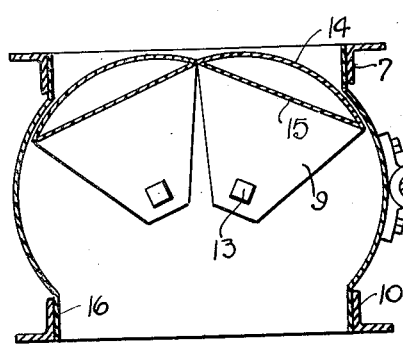
Fig. 3
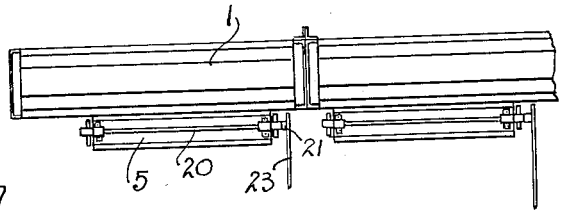
Fig. 1.
Fig. 5.
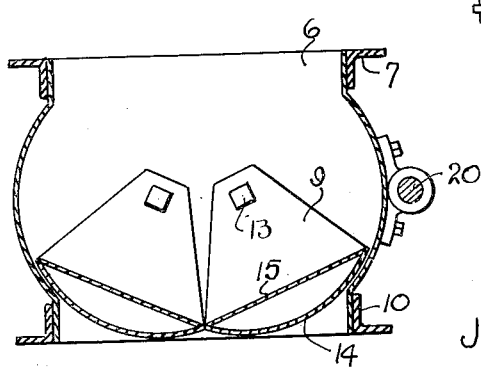
Fig. 4.
John A. Streun  Inventor
By  Jesse P. Stone
Lester B. Clark
Attorneys Patented July 24, 1934

1,967,845

UNITED STATES PATENT OFFICE 1,967,845

CHANGE BALE HOPPER

John Arnold Streun, Sherman, Tex., assignor to Hardwicke-Etter Company, a corporation Application April 5, 1932, Serial No. 603,290

3 Claims. (Cl. 221—144)

My invention relates to hoppers to be used between the usual distributor and a cotton gin and has particular application to the type of valve used therein.

In the operation of a ginning plant it is usual practice to operate a battery of gins from one distributor, said distributor acting to move the cotton along the line of gins and feed the cotton to the hopper of each gin. Sometimes, however, it becomes desirable to close off some of the gins, either to discontinue the operation of them temporarily, or to provide for some change or adjustment upon the gin. In such cases the usual practice has been to provide a valve between the distributor and the gin and to close the valve when the operation of the gin is discontinued. However, when this is done, the cotton below the valve is exhausted from the hopper before the gin is stopped, and later the hopper has to be refilled before the gin is started.

I contemplate the provision of a hopper between the distributor and the gin which may be closed entirely at its upper end to prevent the cotton from feeding to the hopper or which may be closed to allow the filling of the hopper with cotton while the gin is temporarily disconnected.

I also desire to provide an operating mechanism for the valve which may be easily handled by the operator of the gin.

I contemplate the use of a particularly simple type of rotary valve which may be moved to close off the hopper entirely from the distributor or which may be moved into position to stop the feeding of the cotton to the gin but to allow the filling of the hopper while the gin is no longer operated.

In the drawing herewith, Fig. 1 is a side view of the upper end of the cotton gin showing the operating means for my improved valve, the distributor being in vertical section.

Figs. 2, 3 and 4 are transverse sections through the hopper leading to the gin and in which the valves are shown in different positions, Fig. 2 being in feeding position, Fig. 3 in closed position, and Fig. 4 in position closing the entrance to the gin but allowing filling of the hopper.

Fig. 5 is a top plan view of the distributor line showing the manner in which the valve may be operated.

It is to be understood that my device is particularly adapted for use where a plurality of gins and feeders therefor are employed. As will be seen from Fig. 5, there is a distributor line shown at 1 above the gins, in which there is a conveyor, usually a screw conveyor, rotatable therein to convey the cotton longitudinally of the distributor to feed the cotton to the hopper of each of the gins in the line. The construction of the conveyor is shown best in Fig. 1. The conveyor housing is open at 2 to receive the cotton from the separator and the cotton falling upon the screw conveyor 3 is moved longitudinally along from one gin to the other, forcing the cotton through the lower opening in the distributor to the gin hopper below it.

The hopper 5 has an upper opening 6 connected with the lower opening 4 in the conveyor housing, through which the cotton is discharged to the interior of the hopper. My improved hopper is supported along its upper margin upon an angle iron support 7, or other equivalent device. The side walls are extended outwardly at 8 on the arc of a circle to conform to the outer wall of the valve member 9. The lower edge of the side wall is supported upon a longitudinal angle iron 10, resting upon the upper end of the feeder 11.

Within the hopper are valves having end plates 12 adapted to be supported upon bolts or posts 13 extending through the end wall of the housing and furnishing a pivot about which the valves may rotate. The outer wall 14 of the valve is formed on the arc of a circle about the pin 13 and fits closely within the side wall 8 of the hopper. On the inner side of the valve plate 14 is a wall 15, which connects the upper and lower edges of the curved wall 14 of the valve and provides, when the valve is open, as in Fig. 2, a side wall to the hopper, which is flush with the upper and lower edges of the side wall, as indicated at 16.

There are two of these valves as will be noted from Figs. 2, 3 and 4, each of them supported upon a separate pin or bolt 13, which extends through the end walls of the hopper. Each of these pins 13 have a gear 18 on their outer ends. These two gears intermesh so that the rotation of one will cause the rotation of the other. This rotation is accomplished through a quadrant-shaped rack 19, which is rotatable upon a shaft 20, secured upon the side wall of the housing. Upon the rack is an outwardly extending lever arm 21, which has a pin therein to engage within one of a plurality of openings 22 in an operating bar 23.

With reference particularly to Fig. 1, it will be seen that the movement of the rack 19 will cause the rotation of the two shafts 13 in opposite directions, throwing the valves toward and away from each other, depending upon the direction of movement of the rack.

In order that the lever arm 21 may be operated by means within the reach of the operator, the connecting bar 23 is extended downwardly and connected to an arm 24 of a bell crank lever pivoted at 25 on the upper side of the gin 26. The arm 27 of the bell crank lever is provided with a latch rod 28, co-operating with a curved rack 29, fixed to the upper wall of the gin. There is an operating arm 30 upon the latch rod 28 by means of which the latch may be manipulated, to adjust the position of the lever arm 27 into a plurality of positions.

When my hopper is used in ordinary practice it will be opened into the position shown in Fig. 2 when the cotton is to be fed from the conveyor to the gin below the hopper. When this is desired, the lever 21 is moved into a neutral position, as shown in Fig. 1, with the lever arm 27 latched in position midway of the ends of the rack 29. When it is desired to close off the gin entirely from the distributor the valves are moved into the position shown in Fig. 3 with the outer curved walls of the valve presented upwardly, the lever arm 27 is pulled into the outer notch, thus rotating the valves to the Fig. 3 position. In this position of the valves the cotton is carried along the conveyor without entering the hopper and the gin may thus be placed in inoperative position for an indefinite period.

If the gin is to be stopped only temporarily for adjustment or change, it is desired to allow the hopper to fill so that the operation of the gin may be quickly resumed. This is done by moving the valves into the Fig. 4 position by moving the lever arm into the opposite adjusted position, with the lever arm in the inner notch of the rack 29.

The advantages of my particular valve lie in the simple form in which the device is constructed, and the ease with which it may be operated so as to allow the hopper to be open at both ends with plane side walls which allow the feeding of the cotton directly to the gin without obstruction. These valves may, however, be manipulated to entirely close off the hopper or may be manipulated to an opposite position where the hopper may fill up ready for opening at any time to resume the operation of the gin without delay. When the valves are in the Fig. 4 position the capacity of the hopper is slightly increased so that when the valves are moved to open the passage the feeding of the cotton will start effectively at once. Furthermore, the operation of this valve may be easily accomplished by the mechanism described from the operator's position upon the floor of the gin. The further advantages will be obvious to those skilled in the art.

What I claim as new is:

1. A gin attachment including a hopper open at its upper end to receive cotton moved thereto by a conveyor, an open lower end, side walls on said hopper with a central portion curved outwardly on the arc of a circle, valves in said hopper with an outer side curved to fit within said curved side wall, an inner wall on each valve adapted to form straight side walls on the interior of said hopper when said valves are open, and means to move said valves toward or from each other to close either of its open ends, said valves, when in upward position, acting to close off said hopper from said conveyor and when in lower position acting to close off the outlet from said hopper but allowing cotton to enter the same.

2. A cotton hopper having open upper and lower ends, side walls curved outwardly to form a valve housing, valves pivoted at their ends on said hopper and shaped to move into said valve housing, inner plane walls on said valves adapted to close said housing to provide vertical plane sides to the hopper when said valves are open, and means to move said valves to close said hopper at either end thereof.

3. A cotton hopper having open upper and lower ends, valves pivoted at their ends on said hopper, said valves each having an outer curved surface forming a partial cylinder, the inner side of said valves being a flat wall joining the edges of the cylindrical area, and means to move said valves to close said hopper at either end thereof.

JOHN ARNOLD STREUN.